UNITED STATES PATENT OFFICE.

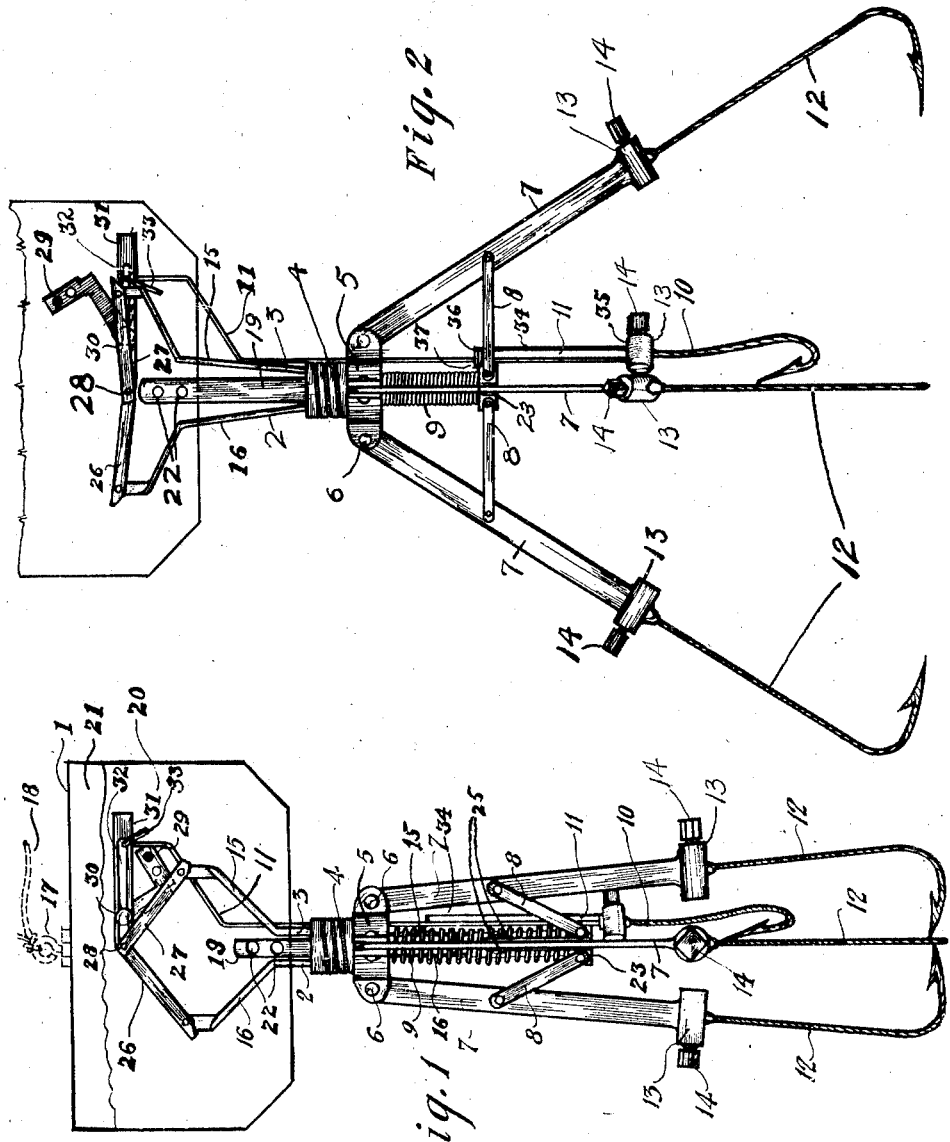

EDDIE JURAS, OF NEWBURYPORT, MASSACHUSETTS.

FISHING DEVICE.

1,334,702.

Specification of Letters Patent. Patented Mar. 23, 1920.

Application filed July 23, 1919. Serial No. 312,835.

*To all whom it may concern:*

Be it known that I, EDDIE JURAS, a citizen of the United States, and resident of Newburyport, in the county of Essex and State of Massachusetts, have invented certain new and useful Improvements in Fishing Devices, of which the following is a specification.

This invention relates to fishing devices, and has for its object to provide a novel appliance for catching and securely retaining the fish and at the same time to provide a signal actuated by the entrapped fish to call the attention of the fisherman by both an audible and a visible signal.

The above and other objects will become apparent in the description below, in which characters of reference refer to like-named parts on the drawings.

Referring briefly to the drawings, Figure 1 is a view of my entrapping device in closed or released position.

Fig. 2 is a view of the same in open position, ready to be sprung.

Referring now in detail to the drawings, 1 represents the frame of my entrapper, the same being shown partly removed in order that its interior mechanism may be clearly shown. Said casing or frame has an eye or hook 17 attached at the top for the reception of the end of the fishing line 18. A rod 19, substantially square in cross-section, is secured inside said frame by means of screws or rivets 22. A head or collar 23 is rigid to said rod at its lower end; short links 8 are pivotally mounted to said collar. Another collar 5 is slidably mounted on said rod 19, and is provided with ears to which long links 7 are pivotally attached. The links 8 are severally pivotally attached to said links 7, as shown. Said collar 5 is provided with a narrowed extension 4. A coiled spring 9 incloses said rod 19 between said collars 5 and 23. A pair of flat spring rods 15 and 16 are secured at their lower ends to opposite sides of said rod 19 by means of a pin or rivet 25. Said spring rods are normally stretched, or tend normally to bend outward from said rod 19, as seen in Fig. 2. Now it is apparent that when the collar 5 is depressed, and the coiled spring 9 contracted, the spring rods 15 and 16 will be spread. The hooks 12 will then be spread apart as shown in Fig. 2. Said hooks are attached to the links 7 through the medium of binding posts 13 and screws 14, the latter retaining the hook in the post. As shown in Fig. 2 the device is in position to be sprung by a fish biting on the hook 10 in the center; the manner in which the trap is set and sprung will be now described.

Short links 26 and 27 are joined pivotally to the springs 16 and 15, respectively, and are mutually pivotally connected by a pin 28. An L shaped link is mounted pivotally within the frame 1 about a pin or pivot 29. On that end of said last named link opposite said pin 29, is a pulley-like attachment or boss 30, rigid to said link. A lever 31, having a longitudinal slot 32 therein, is pivotally mounted on said pin 28. Said boss or pulley 30 engages said slot and is movable therein without danger of falling out because of its pulley-like construction.

The central hook 10 is secured, in the same manner as the hooks 12, to a rod 11; said rod extending upward and being bent and provided with a hooked end 33 secured in the end of the slot 32. A band 34 is secured to said rod 11 at 36 and provides an extension 37 which touches the collar 23 when in the position shown in Fig. 2.

Now let us first assume that the device is to be set into its entrapping position; it is therefore now in the position shown in Fig. 1. The collar 5 is depressed, causing the spring 9 to be depressed and the hooks 12 to be spread apart. The spring rods 15 and 16 also spread apart, causing the links 26 and 27 to straighten out, the pin 28 falling a distance downward. Thus the slotted link 31 turns counter-clockwise on its pivot and assumes the position shown in Fig. 2. The spreading of the links 26 and 27 into an approximately straight line has provided a lock against the return movement of the spring rods 16 and 15; thus the collar 5 is retained locked in its lower position, and the entire trap is set. Now when a fish pulls on the hook 10, the force is transmitted through the rod 11 to the end of the slotted link 31; the latter being fulcrumed about the boss 30. Therefore the lever 31 will be turned about said boss, raising the pin 28 and the links 26 and 27 until the pressure of the two spring rods 16 and 15 will be free to bring said rods together; then the coiled spring 9 is free to raise the collar 5 and thus bring the hooks 12 together. It will be noticed that, when the trap is in position to be sprung, the extension 37 of the band 34 is in contact with the collar 23; thus the pulling of the fish on hook 10 tends to pull said collar downward to start the springing of the trap.

Having thus described my invention, what I claim and desire to secure by Letters Patent is as follows:

1. In a device of the class described, a fish trap comprising a rod having a collar on its end, a second collar slidable on said rod, short links connected to said first-named collar, long links connected to said second named collar, the free ends of said short links being severally connected to said long links, a coiled spring between said collars and about said rod, fish hooks on the ends of said long links, spring rods secured to said rod on opposite sides thereof and extending upward therefrom beyond said second named collar, said spring rods spread apart at the top, a pair of links connected to the ends of said spring rods and to each other, a slotted lever connected to the pivotal point of said last-named links, a movable pulley in the slot of said lever, and a central fish hook having a rod extending upward and having the end of said last-named rod secured in said slot.

2. In a device of the class described, a fish trap comprising a rod having a collar on its end, a second collar slidable on said rod, short links connected to said first-named collar, long links connected to said second-named collar, the free ends of said short links being severally connected to said long links, a coiled spring between said collars, spring rods secured to said rod, said spring rods spread apart at the top, a pair of links connected to the ends of said spring rods and to each other, a slotted lever connected to the pivotal point of said last-named links, a movable pulley in the slot of said lever, and a central fish-hook having a rod extending upward and having the end of said last-named rod secured in said slot.

Signed at Newburyport, in the county of Essex and State of Massachusetts, this seventh day of July, A. D. 1919.

EDDIE JURAS.